United States Patent [19]

Soldavini

[11] Patent Number: 4,958,482
[45] Date of Patent: Sep. 25, 1990

[54] MOWING MACHINE

[76] Inventor: Teodoro Soldavini, Via Leonardo da Vinci 48D, 20062 Cassano d'Adda (Milano), Italy

[21] Appl. No.: 354,926
[22] Filed: May 22, 1989

[30] Foreign Application Priority Data

May 25, 1988 [IT] Italy ............................... 20735 A/88

[51] Int. Cl.⁵ ............................................ A01D 34/03
[52] U.S. Cl. ...................................... 56/14.3; 56/14.7; 56/16.7; 56/DIG. 10; 56/DIG. 22
[58] Field of Search .................. 56/16.7, 16.8, 17.1, 56/17.3, 17.4, 11.9, 14.3, 14.7, 14.8, 202, DIG. 10, DIG. 22; 180/6.3, 6.24, 20, 252, 900; 280/47.11

[56] References Cited

U.S. PATENT DOCUMENTS

| | | | |
|---|---|---|---|
| 706,864 | 8/1902 | Simpson | 56/14.8 X |
| 2,928,487 | 3/1960 | Bobard | 180/252 X |
| 3,579,965 | 5/1971 | Musgrove | 180/20 X |
| 4,736,575 | 4/1988 | Fedeli | 56/202 |

Primary Examiner—Bruce M. Kisliuk
Assistant Examiner—Matthew Smith
Attorney, Agent, or Firm—Bucknam and Archer

[57] ABSTRACT

The mowing machine, of the seated operator type, comprises a supporting frame which supports, at its central portion, a casing including a grass cutting assembly, and a seat for the operator.

The main feature of the machine is that it further comprises, associated with the supporting frame, a front steering column supporting a driven front roller for displacing the machine, there being moreover provided a rear bearing roller and two further rear rollers to allow for the cutting assembly to track the unevennesses of the ground, the two further rear rollers being suitable to stabilize the machine and improve its performance on not perfectly flat soils.

4 Claims, 4 Drawing Sheets

MOWING MACHINE

BACKGROUND OF THE INVENTION

The present invention relates to an improved mowing machine, of the seating operator type.

As is known, several types of mowing machines are presently commercially available in which the operator is seated in a seat supported by the machine frame, these machines generally comprising: a supporting frame which supports: the engine; the transmission train for driving the driving wheels, arranged at the rear of the machine; the steering device which operates the front wheels; the seat for the operator; operating members for driving the operating devices of the machine; the grass cutting device proper and, possibly, a device for collecting the cut grass.

The grass cutting device conventionally comprises a casing which encloses, at the top and sides thereof, one or more grass cutting blades capable of rotating about an axis perpendicular to the ground.

This casing is specifically designed for preventing the mowing machine operator from contacting the cutting blades and for preventing the rotary cutting blades from ejecting cut grass or other bodies toward undesired or dangerous directions.

This casing, moreover, is usually provided with an outlet opening for removing therethrough the cut grass, which removal is conventionally carried out from one of the two sides of the mowing machine or from the rear thereof.

The above disclosed arrangement affords the possibility of applying to the machine a suitable device for collecting the cut grass, which fixture is very important for assuring a proper cleaning of the grass bed and a proper adjusting of the grass growth.

In order to fit several working conditions, the operator must be capable of adjusting the grass cutting height by displacing said casing either upwardly or downwardly, with a parallel relationship to the ground.

This displacement, in particular, is to be easy for the operator and it must be carried out from the operator place.

The cut grass collecting device may be supported either by the casing or directly by the frame of the machine.

In first case, the cut grass collecting device will be displaced either upwardly or downwardly with the casing each time the operator changes the cutting height whereas, in the second case, the position of the cut grass collecting device will be independent from the grass cutting height.

The casing, moreover, can be completely suspended to the frame of the machine and therefore the adjustment of the cutting height is performed by simply raising or lowering the casing and all of the parts forming it or supported thereby.

In order to evenly cut the grass, the casing must be held perfectly parallel to the ground, the result which is rather difficult to be achieved, particularly as the operator desires to cut grass immediately near the ground and the ground is rather uneven.

Thus, a main requirement is that of holding the casing parallel to the ground as far as possible.

In order to achieve this result, there are conventionally provided two small wheels for adjusting the cutting height, which are preferably arranged at the rear of the mentioned casing and affixed to said casing.

Thus, these small wheels will be capable of properly adjusting the cutting height exclusively for a minimum height position.

In other cases, the mentioned rear small wheels have a variable height, preferably by coupling them to the height adjusting device, which involves a modification of this device consisting of coupling the front part of the casing to the machine frame and causing the rear part thereof to bear on the ground through the mentioned small wheels.

It shoould be apparent that such a solution provides a satisfactory evenness of the spacing of the casing from the ground; however, since the small wheels are comparatively narrow, they will furrow the cut grass and impair the aspect of the grass bed.

This mainly occurs in spring and autumn, when a proper treatment of the grass bed is of very great importance.

The seating operator mowing machines are broadly required not only for large extension gardens, but also for average size gardens. Because of this it is very important that these machines be easily handled and provided with a reduced bending radius steering assembly in order to allow for the operator to easily access all of the zones in which grass must be cut.

SUMMARY OF THE INVENTION

Accordingly, the aim of the present invention is to solve the above mentioned problems by providing an improved seating operator mowing machine which has a very reduced size and can be easily handled and which, moreover, affords the advantage of holding the grass cutting assembly at the set height from the ground, even if the ground is rather uneven.

Within the scope of the above mentioned aim, a main object of the present invention is to provide such an improved mowing machine in which the height of the cutting assembly can be easily adjusted without furrowing the ground.

Another object of the present inveniton is to provide such an improved mowing machine which is very reliable in operation and can be easily constructed starting from easily commercially available elements and materials, at a comparatively low cost.

According to one aspect of the present invention, the above mentioned aim and objects, as well as yet other objects, which will become more apparent hereinafter, are achieved by an improved seating operator mowing machine, comprising a frame supporting at the central portion thereof, a casing to the bottom of which there is coupled a grass cutting assembly, and an operator seat, characterized in that said machine further comprises, associated with said frame, a front steering column supporting at least a rolling element coupled to driving means for driving said mowing machine and at least a bearing rear roller suitable to allow for said cutting assembly to track the unevennesses of the ground.

BRIEF DESCRIPTION OF THE DRAWINGS

Further characteristics and advantages of the present invention will become more apparent hereinafter from the following detailed description of a preferred, though not exclusinve, embodiment thereof which is illustrated, by way of an indicative but not limitative example in the figures of the accompanying drawings, in which.

DESCRIPTION OF THE PREFERRED EMBODIMENT

Figure 1:
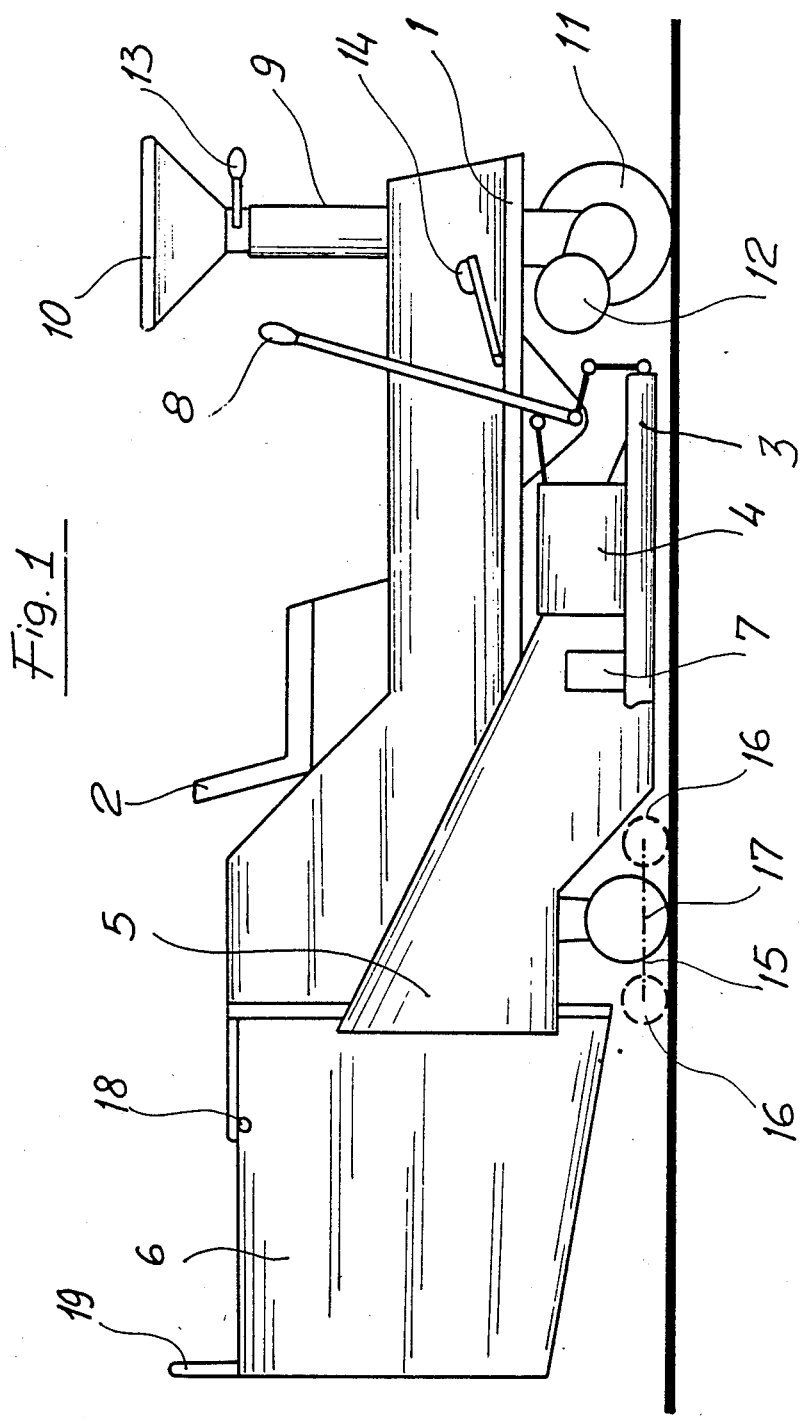
FIG. 1 is a schematic view illustrating a seating operator mowing machine provided with a rear cut grass collecting basket and either one or two rear rollers, so arranged as to hold the machine casing parallel to the ground and provide a very even cutting of the grass.

With reference to the figures of the accompanying drawings, the seating operator mowing machine comprises a frame 1 which supports the main operative components of the machine.

At the central portion of this frame 1 there is provided an operator seat 2 and, to the bottom portion of the frame, there is suspended a mowing casing 3 to the central top portion of which there is affixed an internal combustion engine 4 driving the grass cutting assembly, consisting of one or more blades which are arranged inside the mowing casing, the blades of the cutting assembly rotating about a vertical axis substantially perpendicular to the ground.

The mowing casing 3 is provided with a duct 5, for discharging the cut grass, which duct extends toward the rear portion of the machine, with a slight slope, so as to facilitate the ejection of the cut grass into the cut grass collecting vessel 6.

To the top central portion of the mowing machine, near the engine 4, there is coupled a hydrostatic pump 7 which is preferably driven through a belt directly from the shaft of the engine 4.

The mowing casing 3 is suspended on the frame 1, in such a way that it can be raised or lowered with respect to the frame by operating a lever 8 for adjusting the cutting height.

To the front portion of the frame 1 there is affixed the steering device, consisting of a steering column 9 on the top end of which there is provided a steering wheel 10 for turning, about a vertical axis, the rolling element supported by the steering column, which can consist of one or more large width wheels or a front roller, indicated at 11.

The front roller 11 operates to transmit the translation motion to the mowing machine and is driven by a hydraulic motor 12 which can be either coaxially mounted on the roller or coupled to said roller through a belt or chain transmission.

The controls for varying the machine speed and reversing its movement are provided by a lever 13 or a pedal 14.

To the bottom rear portion of the frame 1 there is applied a roller 15, operating as supporting element, or a roller pair 16 the rollers of which are parallel to one another and have a length substantially equal to the width of the mowing machine.

If two rear supporting rollers are used, they will be swingably mounted about a middle axis 17, equispaced from the axes of the two rollers, so as to fit to uneven ground with good stablity of the machine.

Because of operating and constructional reasons, each roller can consist of several rollers.

To the rear top portion of the frame a vessel 6 can be applied for collecting the cut grass, said vessel being preferably pivoted on the axle 18.

At this vessel is replenished with cut grass, it can be emptied by turning the vessel about the axle or hinge 18, by pulling it by means of the rear handle 19.

In order to completely evacuate not only the cut grass vessel but also the discharging duct of the mowing machine, it will be advantageous to arrange at the bottom portion of the discharging duct a movable wall 20 able of swinging about a hinge 21; this movable wall being arranged in its lowered position, that is on the extension of the cut grass discharging duct during the grass cutting operation, as shown in FIG. 1 representing the mowing machine in its operating condition.

Figure 3:
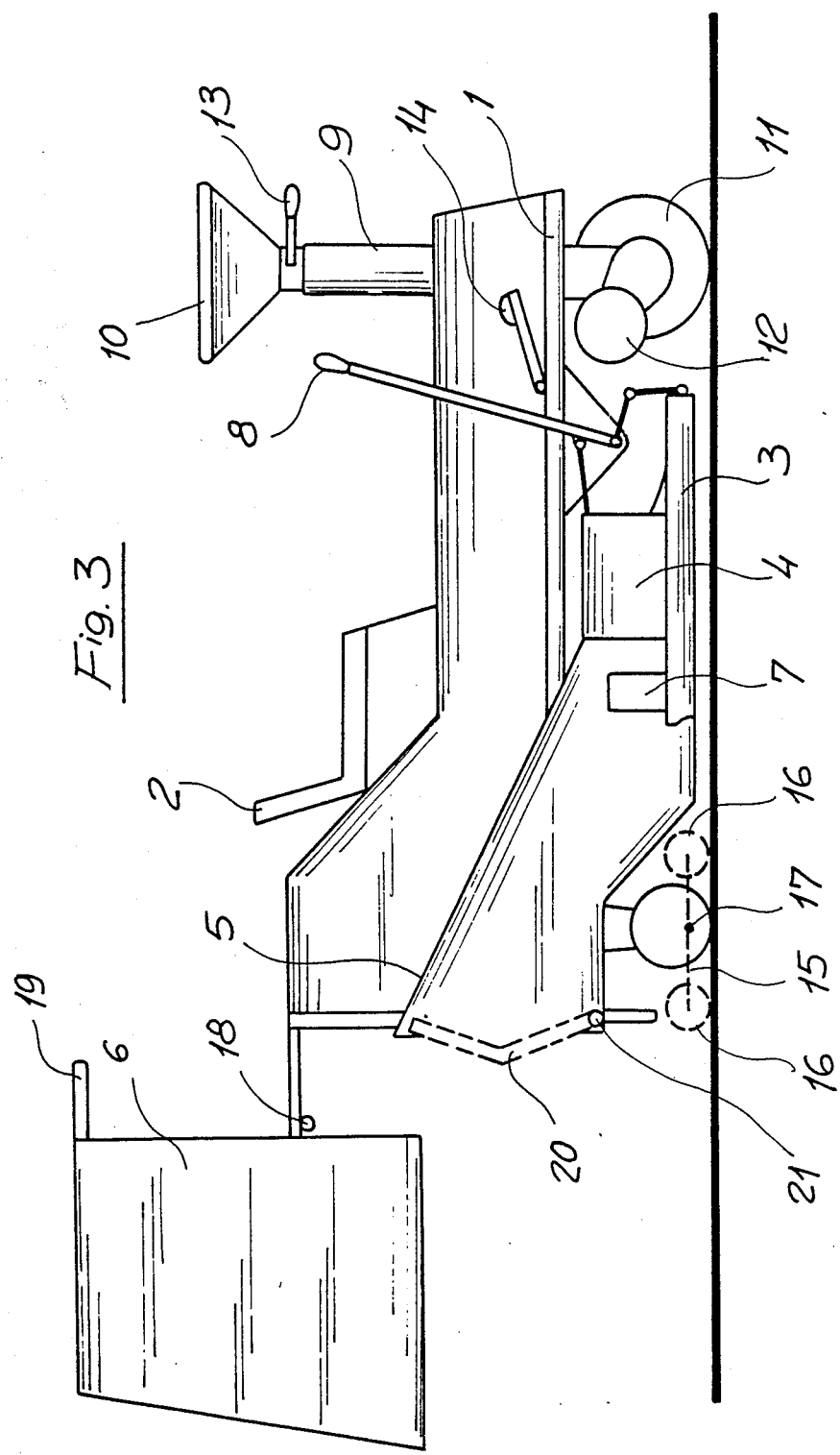
FIG. 3 shows the mowing machine of the preceding figures with the cut grass collecting vessel in a fully raised condition, for carrying out the emptying operation, and with the movable lower wall of the cut grass discharging duct in a raised condition in order to remove cut grass from the discharging duct.

FIG. 3 shows the mowing machine with the cut grass vessel 6 in a fully raised condition, for discharging cut grass, and with the movable wall 20 being raised to eject from the duct 5 possible cut grass present herein.

Figure 2:
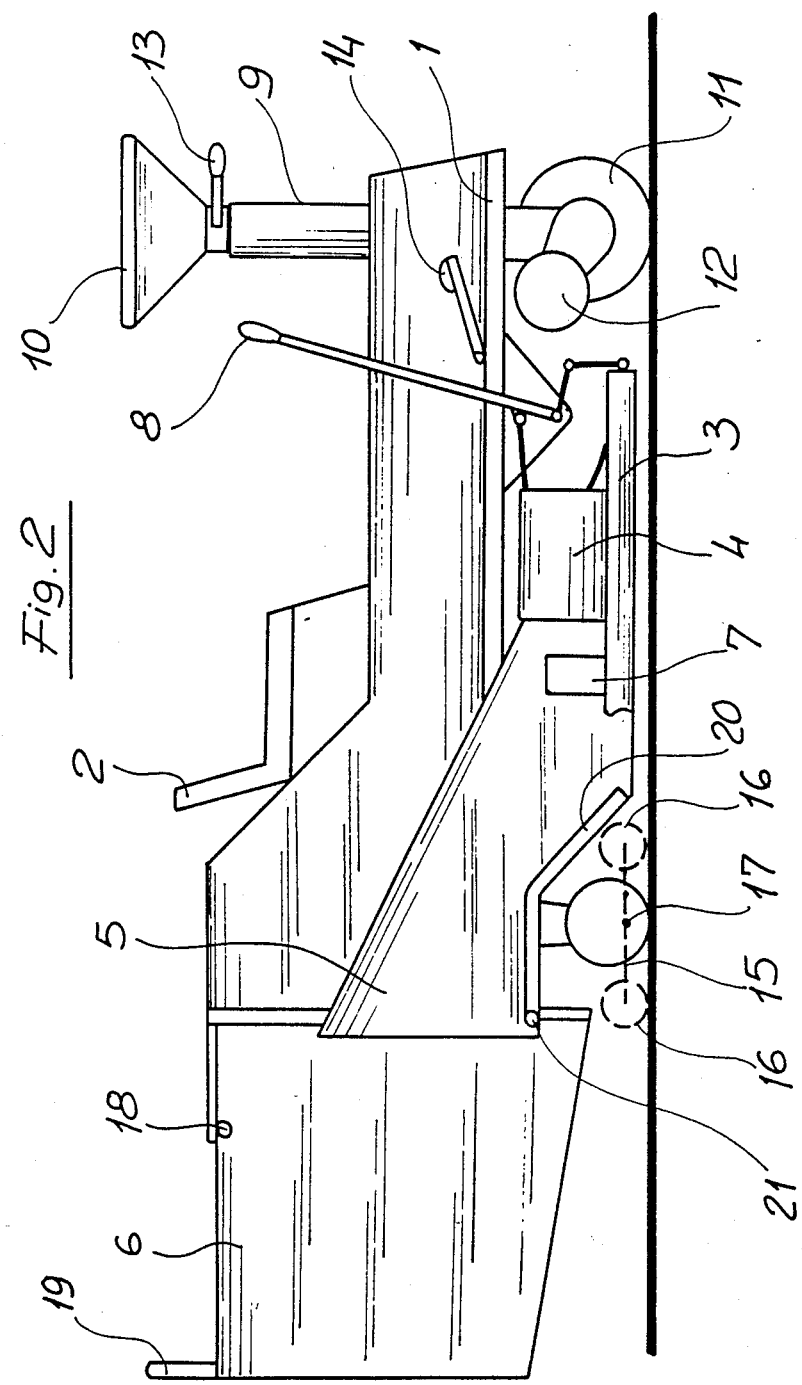
FIG. 2 shows the machine of FIG. 1 as including a movable wall for ejecting cut grass into the cut grass conveyor.

After having carried out the two disclosed operations and brought the machine main components again to the position shown in FIG. 2, the grass cutting operation can be safely restarted.

Figure 4:
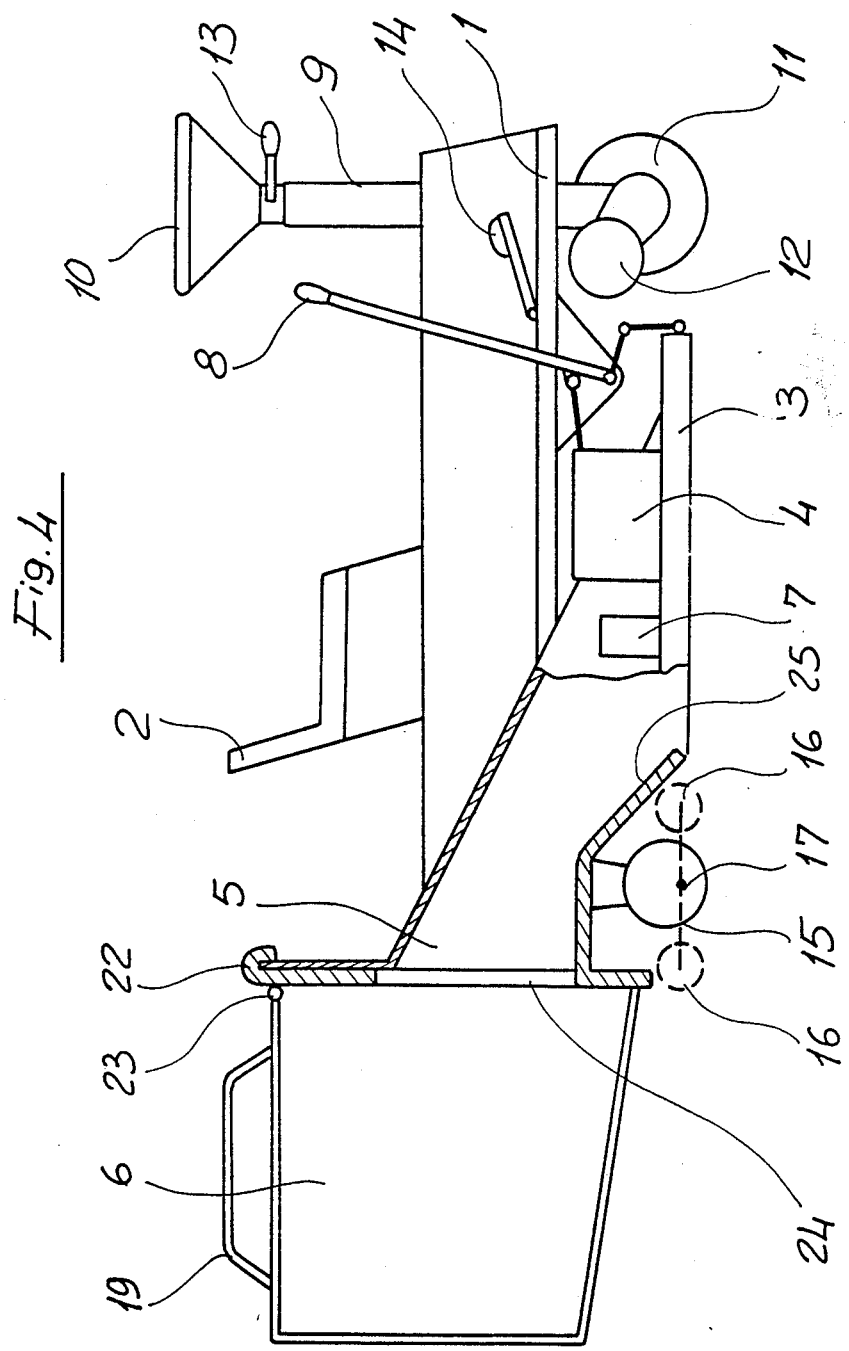
FIG. 4 shows a mowing machine, of the seating operator self propelled type, with a latched rear cut grass container.

As shown in FIG. 4 the cut grass vessel 6 can be engaged, through the hook member 22, to the top rear portion of the frame 1 or, if desired, to the rear portion 5 of the discharging duct of the mowing casing, so as to easily disengage it as the cut grass vessel is to be emptied.

In this case, it will be advantageous to apply on the inlet opening of the vessel a wall 24, pivoted on the axle 23, and to apply to this wall 24 a further wall 25 entering at least partially the bottom portion of the discharging duct.

This wall 25 will provide a full emptying of the discharging duct, each time the full vessel is disengaged for emptying purposes, assuring that no grass will be held at the start of a new grass cutting operation.

From the above disclosure it should be apparent that the invention fully achieves the intended aim and objects.

While the invention has been disclosed and illustrated with reference to a preferred embodiment thereof, it should be apparent that the disclosed embodiment is susceptibe to several modifications and variations all of which will come within the scope and spirit of the appended claims.

I claim:

1. An improved seating-operator mowing machine comprising a frame supporting a casing having a bottom, a grass cutting assembly coupled to said bottom and an operator seat, a front steering column rotatably supporting a driven front roller and two load bearing spaced parallel rear rollers extending transversely of said mowing machine and swingably mounted about a middle axis.

2. A mowing machine according to claim 1, wherein said mowing machine further comprises an hydraulic motor-pump assembly, said hydraulic motor being associated with said front roller for rotatively driving said front roller.

3. A mowing machine according to claim 2, wherein said hydraulic motor is coaxially mounted at one end of said front roller.

4. A mowing machine according to claim 2, wherein said hydraulic motor is coupled to said front roller through a belt transmission.

* * * * *